Aug. 9, 1966 C. M. TUTTLE ETAL 3,264,961
PHOTOGRAPHIC APPARATUS FOR RECORDING, PROCESSING, AND PROJECTING DATA
Filed April 13, 1964 2 Sheets-Sheet 1

CLIFTON M. TUTTLE
ROBERT A. FOX
INVENTORS

BY R. Frank Smith
Steve W. Grambow
ATTORNEYS

Aug. 9, 1966   C. M. TUTTLE ETAL   3,264,961
PHOTOGRAPHIC APPARATUS FOR RECORDING, PROCESSING, AND PROJECTING DATA
Filed April 13, 1964   2 Sheets-Sheet 2

CLIFTON M. TUTTLE
ROBERT A. FOX
INVENTORS

BY R. Frank Smith
Steve W. Grambow
ATTORNEYS

United States Patent Office 3,264,961
Patented August 9, 1966

3,264,961
PHOTOGRAPHIC APPARATUS FOR RECORDING, PROCESSING, AND PROJECTING DATA
Clifton M. Tuttle, Lenox, Mass., and Robert A. Fox, Fishers, N.Y., assignors to Eastman Kodak Company, Rochester, N.Y., a corporation of New Jersey
Filed Apr. 13, 1964, Ser. No. 359,136
5 Claims. (Cl. 95—12)

This invention relates generally to a photographic apparatus, and more specifically to an improved photographic apparatus for recording, processing and illuminating data for projection onto a screen for rapid visual inspection.

There are occasions in photographic work in which extremely fast viewing of photographically recorded data is desired; that is, in which it is desired to reduce to a minimum the time interval between the recording of data on a photographic material and the viewing of it. For example, in radar photography, it is necessary to minimize this time interval as much as possible. Photographic apparatus for use in radar photography for recording data on a photographic material at one station, advancing the material to a second station for processing, and subsequent projection of the data on a screen is disclosed in U.S. Patent 2,688,278, C. M. Tuttle, September 7, 1954. Another apparatus of this type for recording data on a photographic material at one station, immediately processing the exposed data at the same station, and advancing the material to a second station for projecting the data on a screen for viewing is disclosed in U.S. Patent No. 2,856,829, C. Orlando, October 21, 1958. Applicants' invention involves an improved photographic apparatus of the type described for recording data on a photographic material in the form of a latent image, processing the latent image to a visible image, and illuminating the visible image for projection onto a screen for viewing.

One of the objects of the present invention is to provide a photographic apparatus for processing to a visible image a latent image of data recorded on a photographic material, and illuminating the visible image for projection onto a screen for viewing; all of these operations taking place at one station.

Another object of the invention is to provide a photographic recording and processing apparatus in which the time period between the recording of light data on a film in the form of a latent image to a visible image is minimized.

Another object of the invention is to provide a photographic recording, processing and projecting apparatus having an improved processing system.

Another object of the invention is to provide a processing device for a photographic apparatus having a web saturated with processing solution, and means for moving the web transversely of and in engagement with an exposed surface of the film to distribute the processing solution on the film for processing, to provide agitation, and to remove spent solution from the film.

Another object of the invention is to provide an improved processing device for a photographic apparatus having a web saturated with processing solution, and a member reciprocally movable to and from an initial position for moving the web transversely of and in engagement with an exposed film for processing same.

Another object of the invention is to provide an improved photographic recording, processing and projecting apparatus of simple design and construction, thoroughly reliable and efficient in operation, and economical to manufacture.

Objects and advantages other than those set forth above will be apparent from the following description when read in connection with the accompanying drawings, in which.

Figure 4:
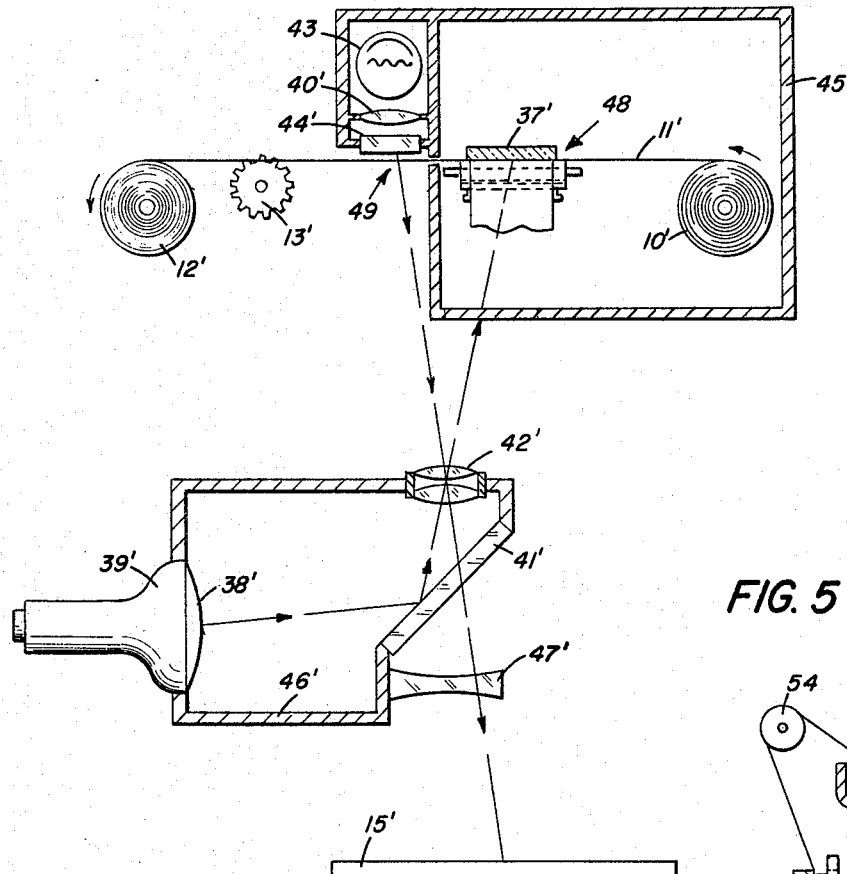
FIG. 4 is a schematic view of a photographic apparatus constructed in accordance with another embodiment of the invention.
Figure 5:
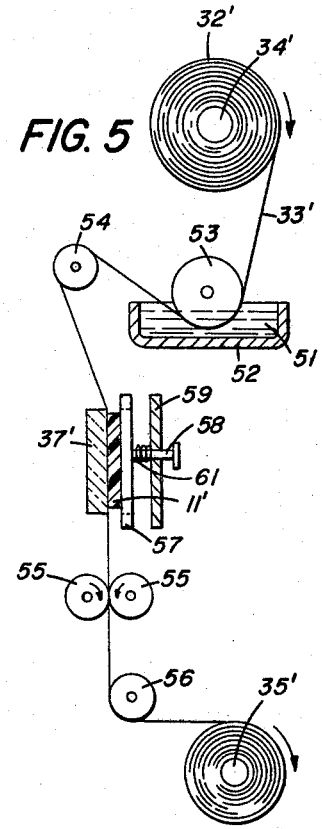
Figure 6:
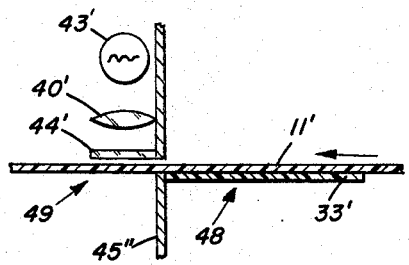

FIG. 5 is an enlarged side elevation view of the processing mechanism incorporated in the apparatus of FIG. 4 with certain portions added thereto; and FIG. 6 is a fragmentary view showing a projection station and an exposing and processing station for a photographic apparatus of the type shown in FIG. 4 in which the stations are located in close proximity to minimize film travel between processing and projection.

Figure 1:
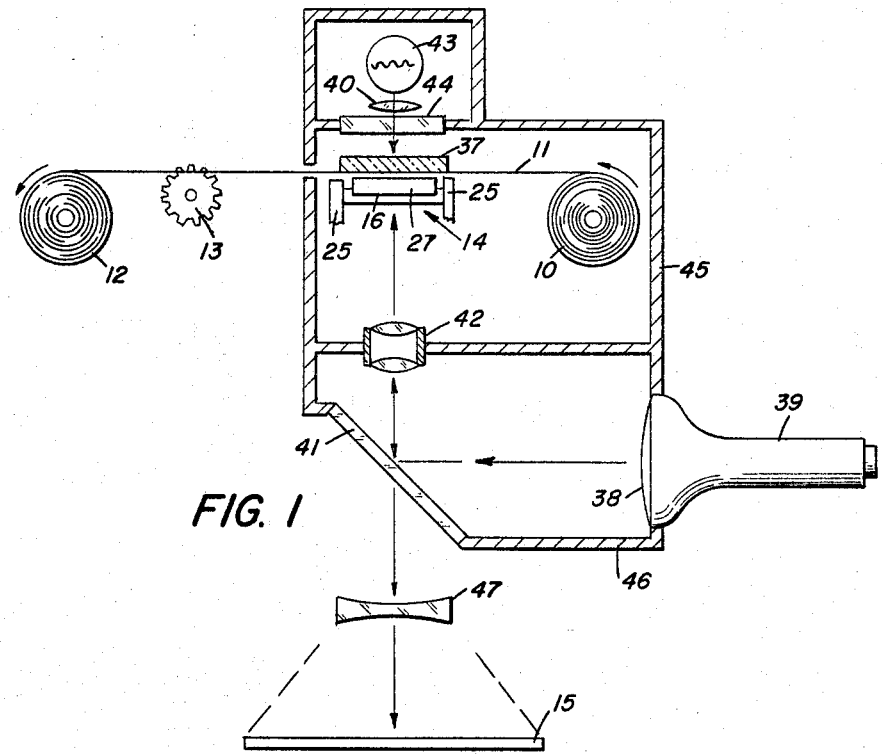
FIG. 1 is a schematic view of a photographic apparatus constructed in accordance with one embodiment of this invention.

Referring to the drawings, a photographic apparatus is schematically disclosed in FIG. 1 having a supply roll 10 of photographic material in the form of a film or web 11 coated with a silver halide emulsion. This photographic material is of the conventional type having the characteristic of being sensitive to actinic wavelengths of light and insensitive to non-actinic wavelengths of light. This photographic material will produce a visible image when exposed to actinic light and processed by a suitable processing solution. The web 11 of photographic material, which may be a perforated film, is advanced from the supply roll 10 and onto a take-up roll 12, preferably a frame at a time, by a sprocket 13 or other suitable means. The film is transported through an operating station, shown generally at 14, where the film 11 is exposed to form a latent image thereon, the latent image processed to a visible image, and the visible image illuminated for projection onto a screen 15 for viewing.

Figure 2:
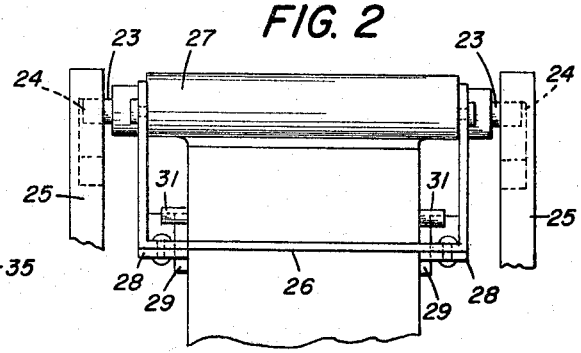
FIG. 2 is an enlarged view of the processing mechanism of the apparatus of FIG. 1 showing certain portions thereof in greater detail.
Figure 3:
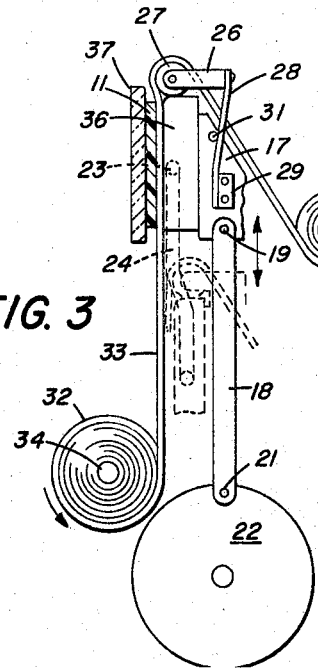
FIG. 3 is a side elevation view of the apparatus of FIG. 2 with certain portions added thereto and others omitted for purposes of clarity.

A processing mechanism 16 is located at the operating station 14, and essentially comprises a carriage 17 (see FIGS. 2 and 3). The carriage 17 is reciprocally movable by any suitable means such as a lever 18 having one end pivotally mounted on a stub shaft 19 on carriage 17, and its opposite end pivotally mounted on a stub shaft 21 eccentrically mounted on a rotatable disk 22. The carriage 17 further has pins 23 extending laterally from each side thereof into grooves 24 in the sides of spaced, stationary frame members 25. The grooves 24, one of which is shown dotted in FIG. 2, have two parallel portions out of alignment with one another, and a diagonal portion interconnecting the two for a purpose to be explained hereinafter.

A U-shaped yoke 26 is positioned above carriage 17 for rotatably supporting an idler roller 27. A pair of leaf springs 28, each having one end 29 thereof secured to a side of carriage 17, and its opposite end secured to yoke 26, urge yoke 26 and roller 27 toward the film 11 as seen in FIG. 2. The movement of yoke 26 in this direction is limited by a pair of outwardly extending pins 31 which form stops for springs 28.

A supply roll 32 of an absorbent web 33 of any suitable type saturated with chemical processing solutions is mounted on a supply spindle 34 biased in a clockwise direction by a spring, not shown. The web 33 is threaded over roller 27 and onto a take-up core 35 which may preferably be mounted on carriage 17, and which is provided with any well-known type of ratchet, not shown, to prevent clockwise rotation of core 35. The carriage 17 is normally in the dotted position shown in FIG. 2 in which it is out of engagement with film 11. When the processing mechanism is operated to process an exposure frame on film 11, the disk 22 is rotated through a single revolution by any suitable single revolution clutch system, not shown, for slidably moving carriage 17 to the full line position shown in FIG. 2, and then returning it to its initial dotted position. As carriage 17 moves up, the pins 23 follow the grooves 24 causing carriage 17 to move laterally toward film 11. The spring biased roller 27 urges the solution saturated web 33 into contact with the emulsion of the image area. The saturated web 33, backed up by a platen 36 on carriage 17, is moved transversely of and in engagement with the image area in one direction, and then in the opposite direction upon retraction of carriage 17 to its initial position. The function of web 33 is to massage the exposed area uniformly with chemicals which preferably combine the reactions of processing and fixation. In addition to distributing the processing solution on film 11, the web by its transverse movement further provides agitation and removes spent solution from the film. A glass back-up plate 37 is provided for the film 11 against which the base of the film is urged. The platen 36 is heated by any suitable means such as imbedded resistive elements, not shown, through which a current is passed. The width of the saturated web 33 is preferably equal to or greater than the exposure frame on film 11 so that the entire frame is processed upon reciprocal movement of carriage 17 and saturated web 33 across film 11.

The data which is to be recorded on the photographic material may be data appearing on a face 38 of a radar screen at one end of a cathode ray tube 39. The cathode ray tube 39 emits a light image of the data which is directed against a dichroic mirror 41. The mirror 41 is coated to transmit wavelengths of light which are non-actinic with respect to the light-sensitive layer of the photographic material and to reflect wavelengths of the light which are actinic with respect to the light-sensitive layer. The actinic light image is reflected through a lens unit 42 which focuses the image onto the emulsion of the film 11 forming a latent image thereon. As soon as the latent image is formed, the aforementioned processing mechanism 16 is actuated by any suitable means, not shown, causing carriage 17 and solution-saturated web 33 to be reciprocally moved across the film 11 and latent image for processing it to a visible image. An illumination system for illuminating the visible image for projection onto a viewing screen 15 comprises a lamp 43, a condenser lens 40 for collating the light, and a filter 44 interposed between lens 40 and backing plate 37 for filtering out the wavelengths of light which are actinic to the emulsion on the film. The transmitted non-actinic visible light illuminates the visible image for projection by the optical system 42, 47 onto viewing screen 15.

Since the web 11 may be sensitive to certain wavelengths of light occurring under normal daylight conditions, it is preferable to house the supply roll 10 and processing mechanism 16 in a suitable light-tight housing 45. Also, if desired, the face 38 of cathode ray tube 39, mirror 41 and lens 42 may form portions of a housing 46.

In the embodiment of the invention disclosed in FIGS. 4–6, parts similar to parts shown in FIG. 1 will be designated by the same numerals primed. In this embodiment, an exposing and processing station 48 and a projecting station 49 are positioned in adjoining relation so that a frame of film 11 is simultaneously exposed to form a latent image, and processed to a visible image at station 48 and the film then advanced to move the visible image to projecting station 49 where it is illuminated for projection onto a screen 15'. In this embodiment, the back-up plate 37' may be heated by any suitable means, not shown, and the applicator web 33' may be presoaked and kept in a sealed cassette, not shown, or transported through a processing solution 51 in a tank 52 as seen in FIG. 5. In this figure, the supply roll 32' of the web material is mounted on a spindle 34' and is threaded around a roller 53 partially extending into the processing solution 51. The web 33' is further trained around an idler roller 54, along back-up plate 37', through a pair of transport rollers 55, around idler roller 56 and onto take-up core 35'. During the operation of the photographic apparatus, the transport rollers 55 transport the chemically saturated web 33' transversely of and in engagement with film 11' at a controlled rate of speed. The film 11' is transported through the exposing and processing station 48 continuously, or a frame at a time, with the emulsion thereof in engagement with saturated web 33'. By having web 33' moved transversely of film 11', it is possible to illuminate the processed portion of the film for viewing with a minimum of film travel, particularly where the film is advanced continuously and the illuminating station 49 and exposing and processing station 48 are located adjacent one another so that the leading edge of the processed portion of film 11' is spaced from the trailing edge of the illumination station only by the thickness of the wall 45'' (see FIG. 6). Since the thickness of wall 45'' may be reduced to an insignificant value, the time interval between processing and viewing is practically non-existent.

The film 11' is urged against saturated web 33' by a spring biased, apertured pressure plate 57. The side rims of plate 57 have a pair of fingers 58 extending through fixed support rails 59, and a spring 61 is interposed between each rail 59 and rim for urging plate 57 against the base of film 11'.

The exposing and illuminating elements in the embodiment disclosed in FIGS. 4–6 are essentially the same as those disclosed in the first embodiment, but the angular disposition of the elements are such that the actinic image of the light data is focused by lens 42' onto the emulsion of film 11' through its base at the exposing and processing station 48, and the visible image is illuminated at the illuminating station 49 for projection through lens 42', 47' onto screen 15'.

The invention has been described in detail with particular reference to several embodiments thereof, but it will be understood that further variations and modifications can be effected within the spirit and scope of the invention as described hereinabove and as defined in the appended claims.

We claim:

1. In a photographic apparatus for processing to a visible image an exposed area of a strip of photosensitive material transported in one direction through a processing station, the combination comprising:
    means for processing said exposed area at said processing station to a visible image, and including
    a porous web saturated with processing solution; and
    means for moving said web in a direction transverse to said one direction and in wiping engagement with said photosensitive material across said exposed area for processing same and removing substantially all spent processing solution from said exposed area.

2. In a photographic apparatus for processing to a visible image an exposed area of a strip of photosensitive material transported in one direction through a processing station, and illuminating the image for projection onto a screen, the combination comprising:
    means for processing to a visible image said exposed area at said processing station, and including
    a porous web saturated with processing solution;
    means for moving said web in a direction transverse to said one direction and in wiping engagement with the exposed area of said photosensitive material across said exposed area for processing same and removing substantially all spent processing solution from said exposed area; and
    means for illuminating said visible image as it is formed and projecting said image onto a viewing screen.

3. The invention according to claim 2 wherein said web moving means intermittently advances said web and comprises a reciprocally movable carriage over which said web is trained.

4. The invention according to claim 3 wherein said carriage supports a pressure member over which said web is trained, and resilient means for urging said pressure member and web into wiping engagement with the exposed surface of said photosensitive material upon reciprocal movement of said carriage.

5. The invention according to claim 4 wherein said pressure member is a roller, and said resilient means comprises a leaf spring.

References Cited by the Examiner

UNITED STATES PATENTS 2,856,829 10/1958 Orlando _____ 95—14
2,930,302 3/1960 Tuttle _____ 95—14

JOHN M. HORAN, *Primary Examiner.*